(12) United States Patent
Persegol et al.

(10) Patent No.: US 12,488,493 B2
(45) Date of Patent: Dec. 2, 2025

(54) METHOD FOR OBTAINING THE POSITION OF A PERSON IN A ROOM, THERMAL IMAGER AND HOME AUTOMATION SENSOR

(71) Applicant: Schneider Electric Industries SAS, Rueil Malmaison (FR)

(72) Inventors: Dominique Persegol, Grenoble (FR); Hector Pharam, Grenoble (FR)

(73) Assignee: SCHNEIDER ELECTRIC INDUSTRIES SAS, Rueil Malmaison (FR)

(*) Notice: Subject to any disclaimer, the term of this patent is extended or adjusted under 35 U.S.C. 154(b) by 275 days.

(21) Appl. No.: 18/189,306

(22) Filed: Mar. 24, 2023

(65) Prior Publication Data
US 2023/0314227 A1    Oct. 5, 2023

(30) Foreign Application Priority Data
Mar. 30, 2022   (FR) ..................... 2202895

(51) Int. Cl.
| | | |
|---|---|---|
| *G06T 7/00* | (2017.01) | |
| *G01J 5/00* | (2022.01) | |
| *G01J 5/02* | (2022.01) | |
| *G01J 5/0806* | (2022.01) | |
| *G01J 5/80* | (2022.01) | |
| *G06T 5/80* | (2024.01) | |
| *G06T 7/70* | (2017.01) | |

(52) U.S. Cl.
CPC .............. *G06T 7/70* (2017.01); *G01J 5/0066* (2013.01); *G01J 5/025* (2013.01); *G01J 5/0806* (2013.01);
(Continued)

(58) Field of Classification Search
CPC ... G06T 7/70; G06T 5/80; G06T 2207/10048; G06T 2207/30196; G06T 2207/30232;
(Continued)

(56) References Cited

U.S. PATENT DOCUMENTS

2017/0372468 A1* 12/2017 Yau .................... G06T 7/0004
2018/0089972 A1* 3/2018 Gabel .................... H04N 23/11
(Continued)

OTHER PUBLICATIONS

Mandel, Christian et al., "People Tracking in Ambient Assisted Living Environments Using Low-Cost Thermal Image Cameras", ICOST 2016, LNCS 9677, May 2016, pp. 14-26. (Year: 2016).*
(Continued)

*Primary Examiner* — Van D Huynh
(74) *Attorney, Agent, or Firm* — Patterson + Sheridan, LLP

(57) ABSTRACT

A method for obtaining the position of a person in a space of a building via a thermal imager including a wide-angle lens, the method including: acquiring, with the thermal imager, through its wide-angle lens, a deformed thermal image of a scene including the person, the deformed thermal image including a hot zone corresponding to the person present in the scene; extracting a region of interest corresponding to the person from the deformed thermal image using an algorithm; determining the position of the region of interest by identifying the polar coordinates distance r and angle θ of the centre of the region of interest in a polar coordinate system the origin of which is at the centre of the deformed thermal image; and obtaining the actual position of the person by applying a wide-angle correction function to the distance r.

18 Claims, 14 Drawing Sheets

(52) U.S. Cl.
CPC .................................... *G01J 5/80* (2022.01);
*G06T 5/80* (2024.01); *G01J 2005/0077*
(2013.01); *G06T 2207/10048* (2013.01)

(58) Field of Classification Search
CPC . G06T 2207/20104; G06T 2207/30242; G01J
5/0066; G01J 5/025; G01J 5/0806; G01J
5/80; G01J 2005/0077; G01J 5/0025;
G01J 5/48; G06V 10/147; G06V 40/10;
G06V 20/52; G01B 21/00
See application file for complete search history.

(56) References Cited

U.S. PATENT DOCUMENTS

| | | | |
|---|---|---|---|
| 2018/0341818 A1* | 11/2018 | Steffanson | G08B 13/19 |
| 2022/0163395 A1* | 5/2022 | Li | G01J 5/0275 |
| 2022/0189280 A1* | 6/2022 | Singh | G08B 21/182 |
| 2023/0005213 A1* | 1/2023 | Tanaka | G06T 15/205 |
| 2023/0351625 A1* | 11/2023 | Hughes | H04N 13/221 |

OTHER PUBLICATIONS

Mandel, Christian et al., "People Tracking in Ambient Assisted Living Environments Using Low-Cost Thermal Image Cameras", ICOST 2016, LNCS 9677, May 2016, pp. 14-26.

Swamidoss, Issac Niwas et al., "Systematic approach for thermal imaging camera calibration for machine vision applications", OPTIK—International Journal for Light and Electron Optics, vol. 247, Sep. 24, 2021, 11 pages.

French Search Report and Written Opinion dated Oct. 26, 2022 for corresponding French Patent Application No. FR2202895, 9 pages.

* cited by examiner

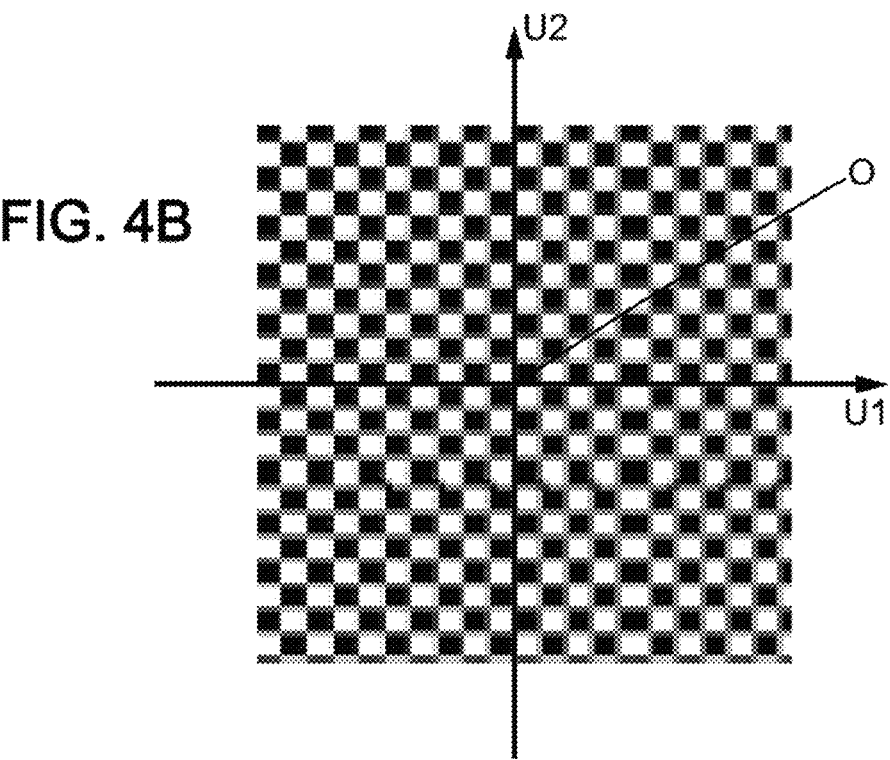

METHOD FOR OBTAINING THE POSITION OF A PERSON IN A ROOM, THERMAL IMAGER AND HOME AUTOMATION SENSOR

TECHNICAL FIELD

The present disclosure relates to a method for obtaining the position of a person in a space in a building. The present disclosure also relates to a thermal imager and home automation sensor configured to implement the method for obtaining the position of the person.

PRIOR ART

In the management of buildings, it is known to employ home automation sensors, also called domotic sensors, allowing the presence of people in one or more interior or exterior spaces of the building to be detected. The space is for example a room or one zone of a room.

The detection of people makes it possible to adjust the power consumed in the corresponding space, for example to light, heat, ventilate or air-condition it. The detection of people also makes it possible to implement video-surveillance functions in the space. It also makes it possible to understand the actual usage of spaces in a building, for example the actual level of usage of meeting rooms, the number of workstations free or occupied in shared offices, etc. The detection of people also makes it possible to determine where it is most appropriate to install fire-protection devices in the building, inter alia.

The detection of people is achieved by installing, in the space in question, a thermal imager capable of sensing the infrared radiation emitted by the bodies present in the space and of creating thermal images of the space based on this sensed radiation. A thermal image may be represented either by levels of greyscale or by zones of different colours depending on the amount of infrared energy emitted by each body in the space. This amount varies depending on the temperature of each body. Thus, it is possible in the thermal image to distinguish people, whose temperature will be located in a temperature range of about 20° C. to 40° C. depending on the clothes being worn, from other bodies present in the space, the temperature of which falls outside the temperature range of the people.

In certain cases, the thermal imager uses a wide-angle lens, for example with a field angle larger than or equal to 120°. Such a lens therefore has a large field of view, this allowing a larger area of the space to be monitored than would be possible with a conventional lens. However, the obtained image is distorted visually, it in particular appearing convex instead of planar. Thus, these known thermal imagers do not allow the position of people in the monitored space to be accurately determined. Optimal management of the building thus becomes difficult.

SUMMARY

The present disclosure improves the situation.

To this end, a method for obtaining the position of a person in a space of a building via a thermal imager located at height in said space and comprising a wide-angle lens is provided, the method comprising steps of:
a) acquiring with the thermal imager, through its wide-angle lens, a deformed thermal image of a scene in the space comprising the person, the thermal image being optically deformed by the wide-angle lens, and the deformed thermal image comprising a hot zone;
b) extracting a region of interest corresponding to the person from the deformed thermal image using an algorithm for detecting hot zones;
c) determining the position of the region of interest in the deformed thermal image by identifying the polar coordinates distance r and angle θ of the centre of the region of interest in a polar coordinate system the origin of which is located at the centre of the deformed thermal image;
d) obtaining the actual position of the person in the space by applying a wide-angle correction function to the distance r so as to compensate for the deformation of the thermal image due to the wide-angle lens.

By virtue of application of the wide-angle correction function to the distance r, it is possible to obtain the actual position of each person in the scene of the monitored space of the building. Thus, management of the building, for example in terms of actual knowledge of the usage of the building, of the usage and degree of occupancy of meeting rooms, of power consumption, of video-surveillance or of installation of fire-prevention devices, is simpler and more exact. Access to the actual position of people also makes it possible to track more accurately occupancy of workstations in shared spaces. It also makes it possible to avoid overcounting in the case of adjacent thermal imagers having a field of overlap. It lastly makes it possible to manage queues more accurately.

Moreover, applying the correction function only to the distance r from the centre of the region of interest representative of the position of the person, and not to the entire deformed thermal image, makes it possible to obtain the position of a person rapidly and computationally efficiently. Thus, the method according to the present disclosure may be implemented even by a low-consumption thermal imager.

The features listed in the following paragraphs may optionally be implemented independently of one another or in any technically possible combination:
the wide-angle correction function applied in step d) comprises a normalization factor Fn for normalizing the distance coordinate r of the centre of the region of interest and a metric factor Fm accounting for a field angle of the wide-angle lens and for a height of installation of the thermal imager in the space of the building with respect to a floor of said space, the wide-angle correction function especially comprising the product of the normalization factor Fn and of the metric factor Fm;
the normalization factor is defined as:

$$Fn = \frac{r}{\beta(1 - \alpha(r^2))}$$

where β is a scale coefficient and α is a distortion coefficient, the scale coefficient β and the distortion coefficient α having predetermined values;
the metric factor is defined as:

$$Fm = (h - h_0)\tan\left(\frac{\gamma}{2}\right)$$

where h is the height of the thermal imager with respect to the floor of the space, $h_0$ is a value representative of the height of the centre of the region of interest with respect to the floor and γ is the field angle of the wide-angle lens;

the wide-angle correction function applied in step d) further comprises a, preferably linear, angular correction factor Fa:

the wide-angle correction function comprises the product of the normalization factor Fn times the metric factor Fm times the angular correction factor Fa;

a value of the angular correction factor Fa is dependent on a value of the angle coordinate θ, the value of the angular correction factor Fa following a sawtooth-shaped distribution a maximum value of which is associated with the values 45°, 135°, 225° and 315° of the angle coordinate θ.

According to another aspect, a thermal imager comprising a wide-angle lens is provided, the thermal imager being configured to implement the method described above.

The features listed in the following paragraphs may optionally be implemented independently of one another or in any technically possible combination:
the lens is a fisheye lens;
the imager comprises a long-wave-infrared imaging sensor for acquiring the thermal images.

According to another aspect, a home automation sensor comprising a thermal imager such as described above is provided.

BRIEF DESCRIPTION OF THE DRAWINGS

Other features, details and advantages will become apparent on reading the description provided below and on examining the appended drawings, in which:

FIG. 4B shows a corrected distribution of the chequerboard pattern of FIG. 4A.

DESCRIPTION OF THE EMBODIMENTS

Figure 1:
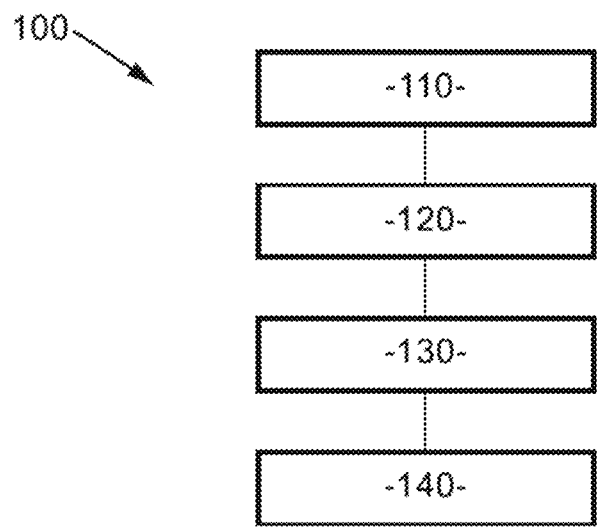
FIG. 1 shows a flowchart of a method for obtaining the position of a person in a space of a building according to one example of embodiment of the invention.

FIG. 1 shows a flowchart of a method 100 according to the invention for obtaining the position of one or more people in a space of a building. The method comprises steps 110 to 140 that will be described below.

By "building", what is meant is any type of building, such as a block of flats, an apartment, an office, etc. The space of the building may be an interior portion of the building, for example a room or one zone of a room, or an exterior portion of the building, for example a balcony, a courtyard or a garden.

As will be described in detail below, in the present text the "position of a person" is understood to mean the coordinates of the point in space where the person is located with respect to the origin of a coordinate system determined beforehand for the corresponding space of the building. These coordinates may be Cartesian or polar. They are expressed in units of length, for example in metres, and, in the case of polar coordinates, in angular units, for example in degrees.

Steps 110 to 140 of the method 100 will now be described.

Step 110 comprises acquiring a thermal image of a scene comprising one or more people. The scene may comprise the entirety of the chosen space of the building or one portion of this space.

Figure 2:
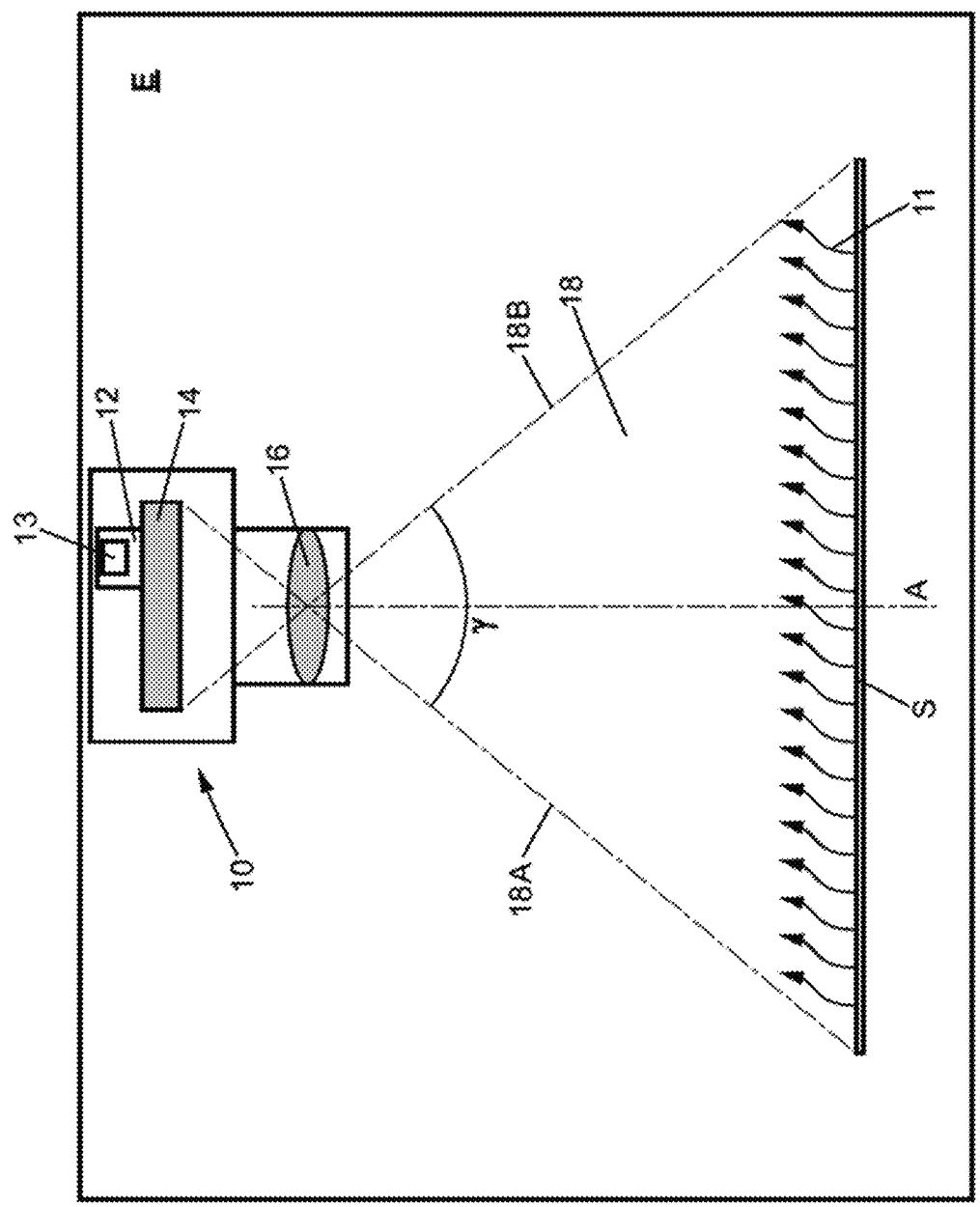
FIG. 2 shows a schematic view of one example of embodiment of a thermal imager installed in a space of a building to implement the method of FIG. 1.

The thermal image is for example acquired 110 by a thermal imager 10, shown in FIG. 2. For the sake of legibility, in this figure the thermal imager 10 has been over-dimensioned with respect to the size of the scene, referenced S, and of the space, referenced E.

Figure 9:
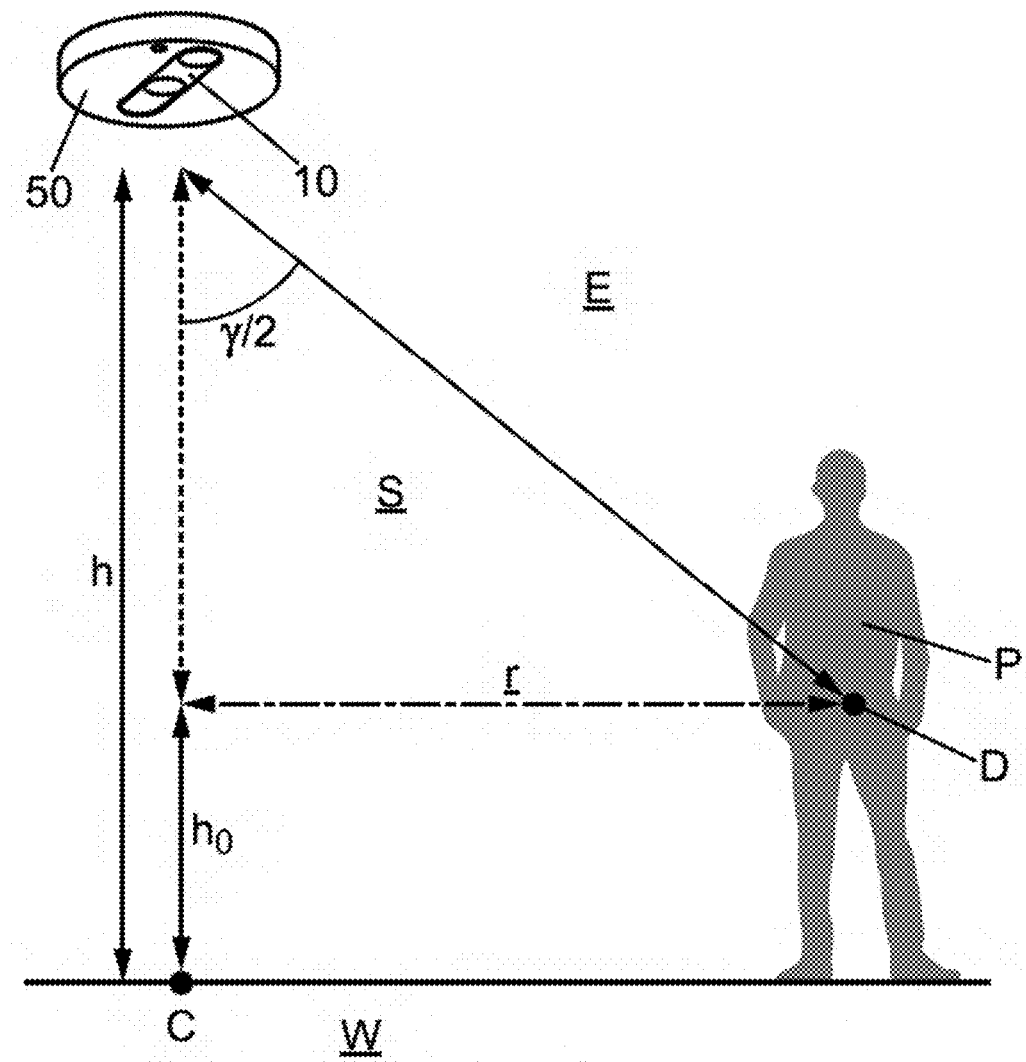
FIG. 9 shows a schematic representation of the installation of a home automation sensor comprising the thermal imager of FIG. 2 in the space E of a building.

As especially shown in FIG. 9, the thermal imager 10 is advantageously placed at a high point above the floor W of the space E, and especially at a height h that allows it to be above any person P present in the space E. For example, the height h is greater than or equal to 2.2 m. In the case of an interior space, the thermal imager 10 is for example installed on the ceiling. In the case of an exterior space, the thermal imager 10 may be installed against a wall bounding the space E or on a high point of a high element comprised in the space E, a street lamp for example. Thus, all the people present in the scene S in step 110 appear in the obtained thermal image, irrespectively of their height.

As will be detailed, the thermal imager 10 is configured to obtain the thermal image by absorbing the infrared radiation 11 emitted by the various bodies present in the scene S. By "body" what is meant is any living being or any object present in the scene S. Thus, the body may be a person, an animal, a plant, an electronic device, a piece of furniture or a wall comprised in the scene S, inter alia.

The obtained thermal image is formed by pixels distributed in a plane comprising a first direction and a second direction that are perpendicular to each other. The number of pixels of the thermal image is determined by the resolution of the thermal imager 10. For example, for an imager the resolution of which is 80×80 pixels, the obtained thermal image comprises a row of 80 pixels in the first direction, and a column of 80 pixels in the second direction.

The thermal imager 10 comprises a computing device 12, a set of elementary thermal sensors 14, which are also called infrared sensors, and a lens 16.

In the example of FIG. 2, the computing device 12 is integrated into the thermal imager 10, but it could be an external device connected to the thermal imager 10. The computing device 12 comprises a processor 13. The processor 13 may be involved in the implementation of steps 110 to 140 of the method 100, as will be detailed.

The infrared sensors of the set 14 are distributed in the first direction and in the second direction. In particular, the number of infrared sensors in each of the first and second directions is equal to the number of pixels in the thermal image in each of these directions.

Each infrared sensor is configured to absorb the infrared radiation 11 emitted by the bodies present in the scene S. The infrared radiation 11 absorbed by the sensor 14 causes variation in a physical quantity in each elementary thermal sensor that is dependent on the amount of infrared radiation absorbed. As known, the higher the temperature of a body, the more infrared radiation this body emits, this increasing the amount of infrared radiation 11 absorbed by the sensor 14. The infrared sensor 14 thus generates different signals depending on the temperature of each body present in the scene S.

Depending on the way in which the signals used to create the thermal image are generated, the infrared sensor 14 may be a bolometer (or microbolometer), a pyroelectric sensor or a thermoelectric sensor, inter alia.

In a bolometer or microbolometer, the signals used to obtain the thermal image are generated by the sensor 14 based on a variation in its electrical resistance. In particular, the heating of the sensor 14 caused by absorption of infrared radiation makes the electrical resistance of the sensor 14 vary. The value of the variation in electrical resistance is associated with a temperature variation.

In the case of a pyroelectric sensor, the heating of the sensor 14 caused by the absorption of the infrared radiation generates in the sensor 14 a variation in electrical bias that is related to the temperature increase.

In the case of a thermoelectric sensor, the absorbed infrared radiation generates in the sensor 14 a voltage variation associated with a temperature variation.

The signals generated by the infrared sensor 14 therefore depend on the temperature of each body in the scene S.

Advantageously, the infrared sensor 14 operates at room temperature. The thermal imager 10 is therefore a non-cooled thermal imager.

As indicated above, the signals generated by the infrared sensor 14 are transmitted to the computing device 12. The processor 13 processes these signals, which correspond to the thermal image associated with the scene S.

As mentioned above, the thermal image comprises a plurality of pixels. Each pixel represents a point of specific temperature of a body present in the scene S. Depending on the temperature of the respective point, each pixel of the thermal image may be represented in greyscale. Thus, as is clearly shown in FIG. 3, the thermal image comprises light zones 15 and dark zones 17.

Figure 3:
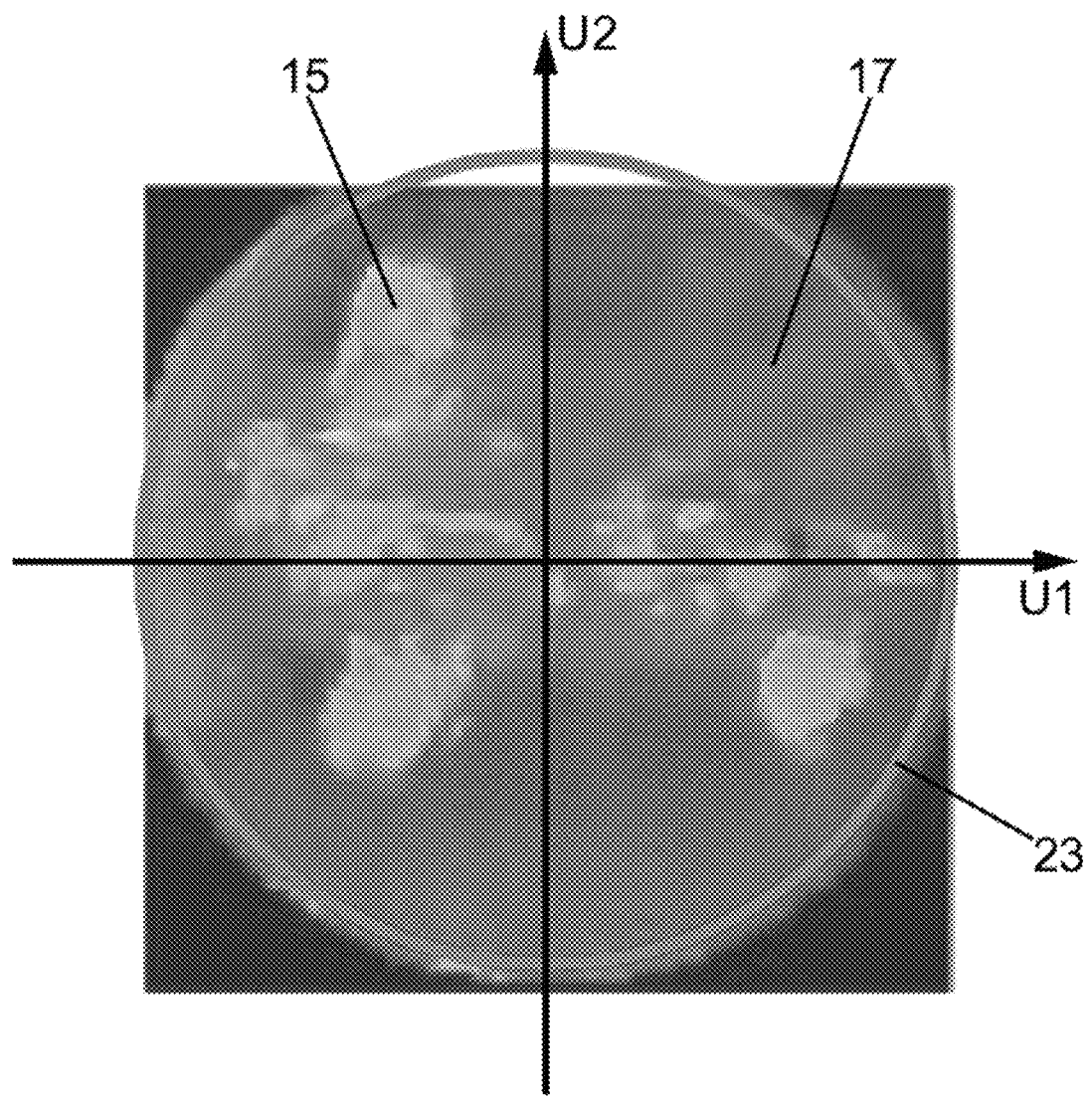
FIG. 3 shows one example of a thermal image obtained using the thermal imager of FIG. 2 during implementation of a step of the method of FIG. 1.

The light zones 15 and the dark zones 17 assist with identification of the various heat sources present in the scene. In the image of FIG. 3, the light zones 15 correspond to bodies the temperature of which is located in a given temperature range, called the reference temperature range, whereas the dark zones 17 correspond to bodies the temperature of which falls outside the reference temperature range. The reference temperature range for example extends from 20° C. to 40° C. For the sake of clarity, below the light zones 15 will thus be called "hot zones", and the dark zones 17 will thus be called "cold zones". It will however be noted that this hot zones/light zones and cold zones/dark zones correspondence is non-limiting. It will also be noted that the temperature of the cold zones 17 is generally lower than the temperature of the hot zones 15, but the contrary is also possible. In other words, the temperature of the cold zones may either be below the lower limit of the reference temperature range, or above the upper limit of the reference temperature range.

The lens 16 is a wide-angle lens. The wide-angle lens 16 has a short focal length, this giving it a large field of view and especially a field of view larger than that of the human eye. In particular, a field angle γ of the wide-angle lens is preferably larger than or equal to 120°. As is clear in FIG. 2, in the present text the field angle γ is understood to mean the opening angle of the conical field of view 18. By "opening angle", what is meant is the maximum angle made by two straight-line generatrices 18A, 18B of the cone 18. In other words, the opening angle of the cone 18 corresponds to two times the angle made between the axis of revolution A of the cone 18 and one of its straight-line generatrices.

According to one non-limiting example, the wide-angle lens 16 is a fisheye lens. The fisheye lens is a type of wide-angle lens having a field angle γ that may reach 180°.

Since the wide-angle lens 16 has a large field of view, it is possible to capture larger scenes S than would be possible with a lens having a field of view similar to that of the human eye. However, the thermal image obtained using the thermal imager 10 equipped with the wide-angle lens 16 has a convex distortion.

Figure 4A:
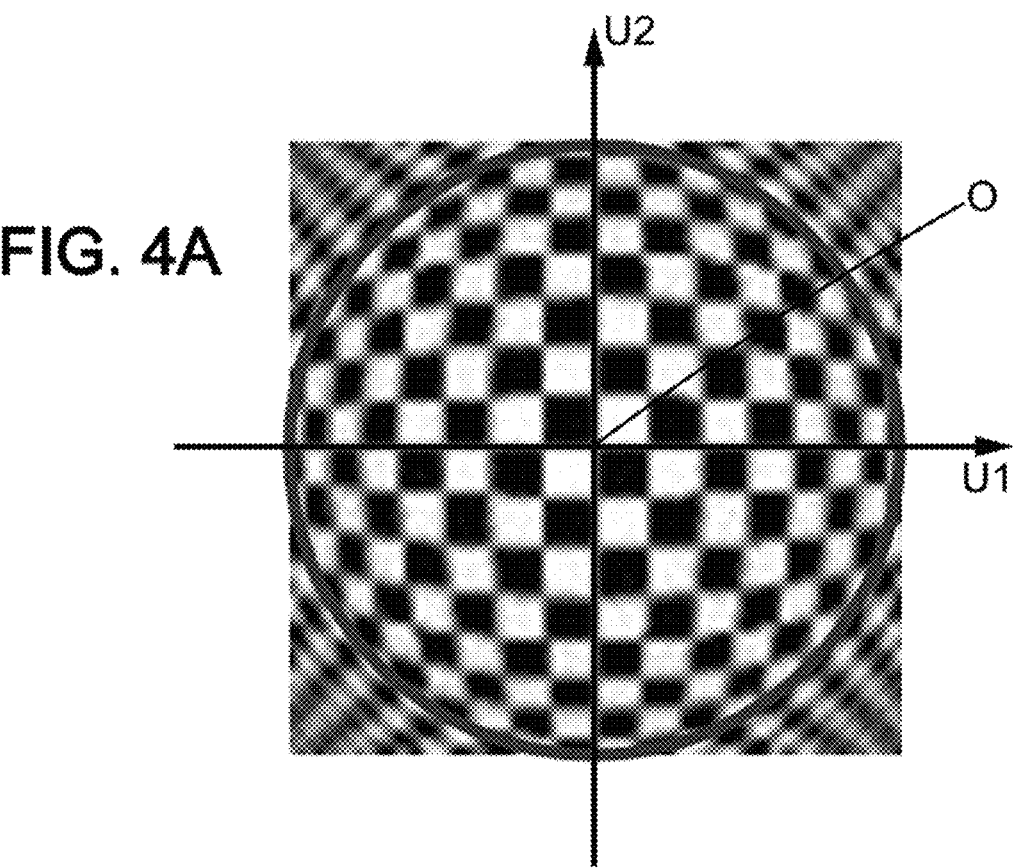
FIG. 4A shows a typical deformation of a chequerboard pattern obtained by an imager equipped with a wide-angle lens.

To better understand this effect, reference is now made to FIGS. 4A and 4B. FIG. 4A shows a reference chequerboard image acquired through a fisheye lens. As clearly shown, the reference image has a convex deformation. FIG. 4B for its part shows the form of the non-deformed reference chequerboard image. Contrary to FIG. 4A, in this case the image has a planar appearance.

An orthonormal coordinate system comprising a first axis U1 and a second axis U2 has been used in each of these figures. The point O corresponds to the origin of the orthonormal coordinate system. The origin O corresponds to the centre of the obtained image of the scene, and to the centre of this scene. The centre of the obtained image corresponds to the optical centre of the wide-angle lens used.

The first axis U1 indicates the distance in pixels in a direction parallel to the axis U1 occupied by a determined pixel of the image with respect to the origin O. The second axis U2 indicates the distance in pixels in a direction parallel to the axis U2 of a determined pixel of the image with respect to the origin O. Since the origin O corresponds to the centre of the obtained image of the scene S, the number of pixels placed on either side of the axis U1 is the same. Analogously, the number of pixels placed on either side of the axis U2 is the same. Thus, for an imager the resolution of which is 80×80 pixels, 40 pixels are placed on each side of the axis U1, and 40 pixels are placed on each side of the axis U2.

As clearly shown in FIG. 4A, the deformation of the image with respect to the image of FIG. 4B increases with distance from the centre O of the image obtained by the imager.

As will be detailed below, deformation decreases with distance from any direction making an angle of 45° to the axes U1 and U2. Thus, zones located in directions making an angle equal to 45°, 135°, 225° or 315° to the axis U1 are the zones that experience the most deformation related to the use of the wide-angle lens.

Step 120 of the method 100 will now be described. Step 120 comprises extracting a region of interest corresponding to a person visible in the deformed thermal image.

As indicated above, in the deformed thermal image obtained in step 110, the hot zones 15 correspond to the bodies of the space the temperature of which is located in the reference temperature range. Such a temperature range corresponds to a range of temperatures at which people present in the scene S will potentially be depending on the clothes they are wearing. Any person present in the scene S will therefore appear in the deformed thermal image as a hot zone 15. In the scene S there may be other bodies the temperature of which is in the reference temperature range, for example an animal or a working electronic device. Therefore, such bodies also appear as hot zones 15 in the deformed thermal image obtained in step 110.

In order to distinguish hot zones 15 corresponding to people from other hot zones 15, the method 100 uses an algorithm for detecting people allowing a finer analysis of these hot zones 15 to be carried out. The algorithm is for example included in software run by the computing device 12 of the thermal imager. This software may be implemented by the processor 13.

Figure 5:
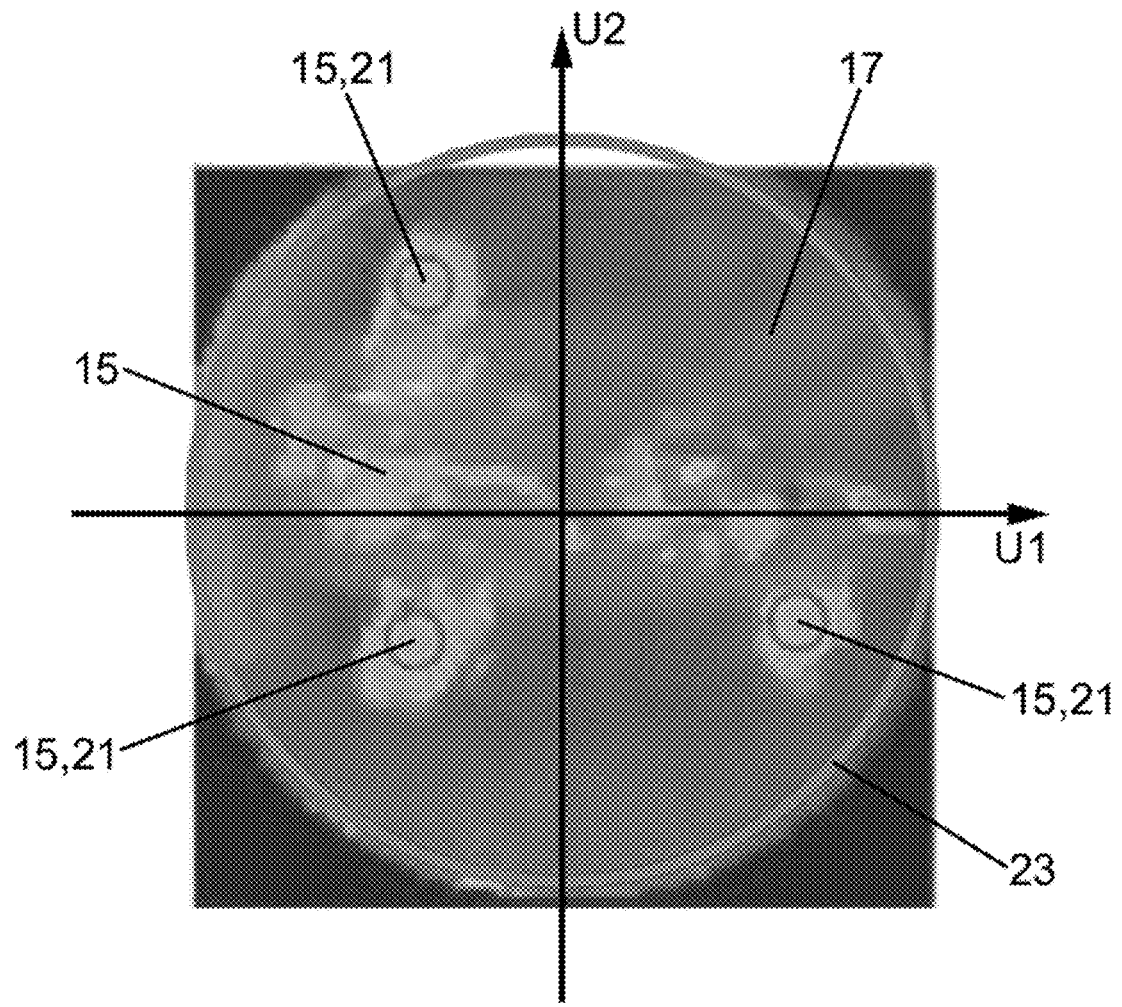
FIG. 5 shows the thermal image of FIG. 3 after application of a subsequent step of the method of FIG. 1.

Through application of this algorithm, the computing device 12 is capable of identifying, among the hot zones of the deformed thermal image, regions of interest 21. In FIG. 5, the regions of interest 21 are the hot zones 15 in which circles have been placed. The regions of interest 21 correspond to people present in the scene S.

According to one non-limiting example, the people-detecting algorithm may be configured to detect certain people-specific features, for example based on analysis of the area of each hot zone 15 or on the ability of each of these hot zones 15 to move in the scene S.

It will be noted that identification of the regions of interest 21 in the deformed thermal image does not allow the actual position of the people with respect to the centre of the scene S to be deduced directly. Specifically, since the thermal image is deformed, the position of a region of interest 21 is deviated with respect to the position of the corresponding person in the scene S. To correct this deviation, the method 100 comprises steps 130 and 140, which will now be described.

Step 130 of the method 100 comprises determining polar coordinates of the centre of each region of interest 21 in a polar coordinate system the origin of which is located at the centre O of the deformed thermal image.

By "centre of each region of interest" what is meant is the centre of gravity of the points forming the region of interest 21. The centre of each region of interest 21 corresponds to the central point of each circle positioned in each of the regions of interest 21 in FIG. 5.

Figure 6:
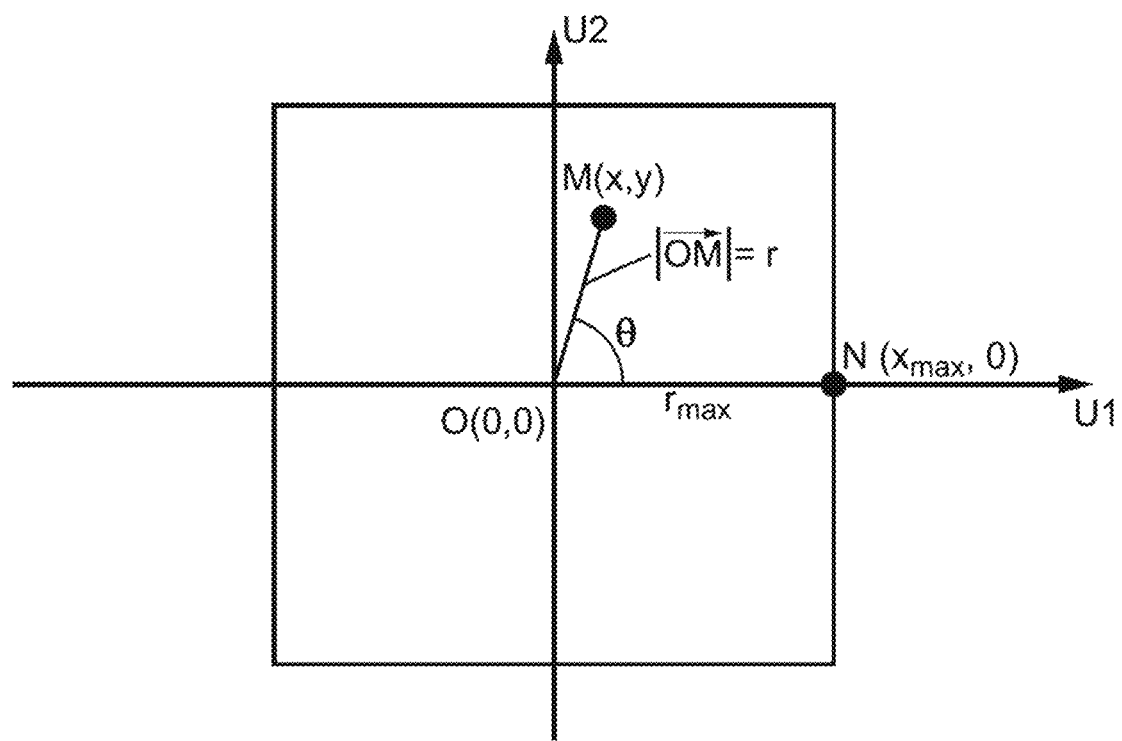
FIG. 6 is a schematic representation showing the centre of a region of interest of a thermal image in a polar coordinate system.

In FIG. 6, the polar coordinate system corresponds to the orthonormal coordinate system comprising the axes U1 and U2 previously used in FIGS. 3 to 5. As already indicated, the centre O of the deformed thermal image corresponds to the optical centre of the wide-angle lens 18.

The point M is considered to be the centre of a region of interest 21. The point M has the coordinates (x, y) in the employed orthonormal coordinate system. This means that the point M corresponds to the point located at a distance of x pixels from the origin O in the direction parallel to the axis U1 and at a distance of y pixels from the origin O in the direction parallel to the axis U2.

Determination of the polar coordinates of the point M comprises, on the one hand, determining the distance r separating the point M from the centre O of the deformed thermal image. This distance r corresponds to the modulus of a vector $\overrightarrow{OM}$ joining the centre O and the point M. Since the centre O of the thermal image has the coordinates (0, 0), the distance r is defined as:

$$r = \sqrt{x^2 + y^2} \qquad \text{[Math. 1]}$$

The distance r is a unitless decimal number.

It will be noted here that identification of the regions of interest 21 is limited to the area comprised in a circle 23 (shown in FIGS. 3 and 5) the diameter of which in pixels is equal to the total number of pixels in one of the directions parallel to either one of the axes U1 and U2. As explained above, this total number of pixels depends on the resolution of the thermal imager. In the described example, in which the imager has a resolution of 80×80 pixels, the diameter of the circle 23 is therefore equal to 80 pixels. This implies that the maximum value $r_{max}$ obtainable by the distance r in the present step 130 of the method 100 is equal to the distance in pixels separating the last pixel located on the axis U1 or U2 from the origin O. In other words, the maximum value $r_{max}$ obtainable by the distance r is equal to the radius in pixels of the circle 23. In the case of an imager the resolution of which is 80×80 pixels, the maximum value $r_{max}$ of the distance r is therefore equal to 40. In the example of FIG. 6, the distance r therefore obtains its maximum value $r_{max}$ at the point N.

On the other hand, determination of the polar coordinates of the point M comprises determining the polar angle or azimuth θ. As is clearly shown in FIG. 6, the azimuth θ corresponds to the angle made between the axis U1 and the vector $\overrightarrow{OM}$. The azimuth θ is therefore defined as:

$$\theta = \tan^{-1}\left(\frac{y}{x}\right) \qquad \text{[Math. 2]}$$

The polar coordinates (r, θ) of the centre of a region of interest 21 allow this centre to be located in the deformed thermal image unambiguously.

The centre of a region of interest 21 is here considered to correspond to the "centre of gravity" of the person identified for the region of interest 21 in the deformed thermal image. Since the centre of gravity of a sitting or standing person is typically located at a height comprised between 0.7 m and 1.3 m with respect to the floor, the polar coordinates are here considered to be given at a height $h_0$ with respect to the floor that is for example equal to 1 m.

Step 140 of the method 100 comprises obtaining the actual position of the person by applying a wide-angle correction function to the distance r to compensate for the deformation of the thermal image. This step 140 is in particular applied to the distance r obtained for each region of interest identified in step 120.

The wide-angle correction function comprises a first factor, called the normalization factor.

The normalization factor aims to normalize the distance coordinate r obtained for the centre of each region of interest 21 identified in step 120. By "normalize" what is meant is association of each value of the distance coordinate r with a value comprised between 0 and 1. In particular, the normalization factor is defined so that its value for the centre of a region of interest 21 coincident with the centre O of the deformed thermal image is equal to 0, and so that its value for the centre of a region of interest 21 the coordinate r of which has the maximum value $r_{max}$ is equal to 1. Thus, for a region of interest 21 the centre of which does not coincide with the centre O of the thermal image but is located at a radial distance from the centre O smaller than the maximum value $r_{max}$ of the distance r, the normalization factor has a value higher than 0 and lower than 1. More precisely, the normalization factor is defined so that, for any distance value r comprised between 0 and $r_{max}$, the value of the normalization factor obeys a law that causes it to increase as the distance r approaches its maximum value $r_{max}$, as in the graph of FIG. 7.

According to one non-limiting example, the normalization factor Fn is defined as:

$$Fn = \frac{r}{\beta(1 - \alpha(r^2))} \quad \text{[Math. 3]}$$

Figure 7:
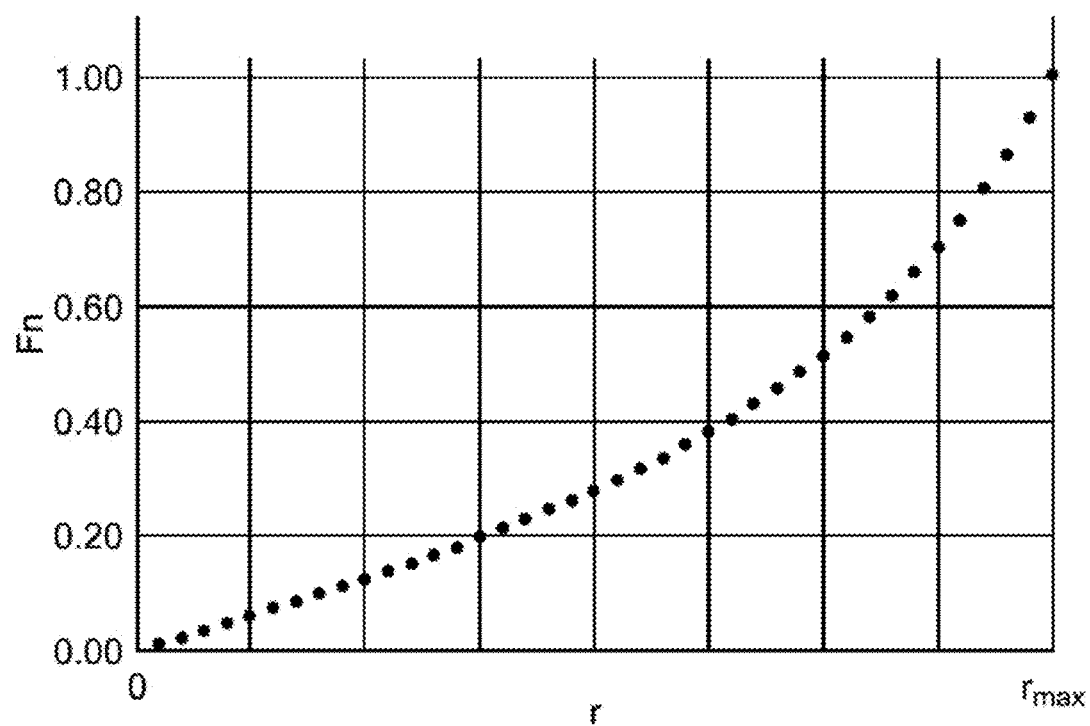
FIG. 7 is one example of a graph showing the values of a normalization factor applied in a step of the method of FIG. 1 as a function of a distance in pixels from a centre of a region of interest of the thermal image of FIG. 3 to the centre of this image.

By applying this definition of the normalization factor, a distribution of normalization-factor values as a function of distance r similar to the distribution in the graph of FIG. 7 is obtained.

The coefficient α is a distortion coefficient that determines the curvature of the distribution of the graph of FIG. 7. Modification of the value of the coefficient α allows this curvature to be modified, this allowing the rate of growth of the normalization factor between the values 0 and 1 to be adjusted.

The coefficient β is a scale coefficient that makes it possible to ensure, whatever the value chosen for the distortion coefficient α, that the normalization factor has the value 1 when the coordinate r of the centre of a region of interest 21 is equal to the maximum value $r_{max}$.

The values of the coefficients α and β are therefore predetermined so as to guarantee that the normalization factor indeed allows each value of the distance coordinate r to be associated with one value comprised between 0 and 1. These predetermined values are obtained empirically.

For example, in a case where $r_{max}$ is equal to 40, α may be equal to 0.00032 and β may be equal to 83.

As will be detailed, by virtue of the normalization factor, it is possible to obtain the actual position of each person in the space E simply. It is enough to know merely the field angle γ of the wide-angle lens 16 and the height h of installation of the thermal imager 10. The field angle γ of the wide-angle lens 16 is normally indicated on its datasheet, whereas the height h of installation of the thermal imager 10 is generally easily measurable.

To this end, the wide-angle correction function comprises a second factor, called the metric factor, that accounts for the field angle γ and the height of installation h.

More precisely, the metric factor has a value that depends on the field angle γ of the wide-angle lens 16, on the height h of installation of the thermal imager 10 and on the height $h_0$ employed as reference height with respect to the floor W. In particular, in one example, the metric factor Fm is defined as:

$$Fm = (h - h_0)\tan\left(\frac{\gamma}{2}\right) \quad \text{[Math. 4]}$$

The metric factor is therefore a factor that remains constant once the field angle γ, the height h and the height $h_0$ have been set. In other words, this factor does not depend on the coordinates of the centre of the identified regions of interest 21.

As may be clearly deduced from FIG. 9, the metric-factor value obtained from [Math. 4] corresponds to the distance R separating the centre C of the scene S from an end point D located at the edge of the scene S. This end point D is found, in the thermal image obtained in step 110, at the edge thereof with a distance coordinate r equal to the maximum value $r_{max}$.

The metric factor is expressed in metres or any other commonly used unit of length.

The wide-angle correction function Fc is defined as the product of the normalization factor Fn and of the metric factor Fm, i.e.:

$$Fc = Fn \cdot Fm \quad \text{[Math. 5]}$$

Thus, when the normalization and metric factors are defined such as suggested in [Math. 3] and [Math. 4], the wide-angle correction function Fc is:

$$Fc = \frac{r}{\beta(1 - \alpha(r^2))}(h - h_0)\tan\left(\frac{\gamma}{2}\right) \quad \text{[Math. 6]}$$

Since the normalization factor is adimensional, the result of the wide-angle correction function is given in metres (or any other unit of length) because of the metric factor. The result of the wide-angle correction function in particular corresponds to the distance separating the associated person from the centre C of the scene S. Thus, the result of the wide-angle correction function and the azimuth θ obtained in step 130 give the actual position of the person in the space E with a satisfactory degree of accuracy.

Figure 8:
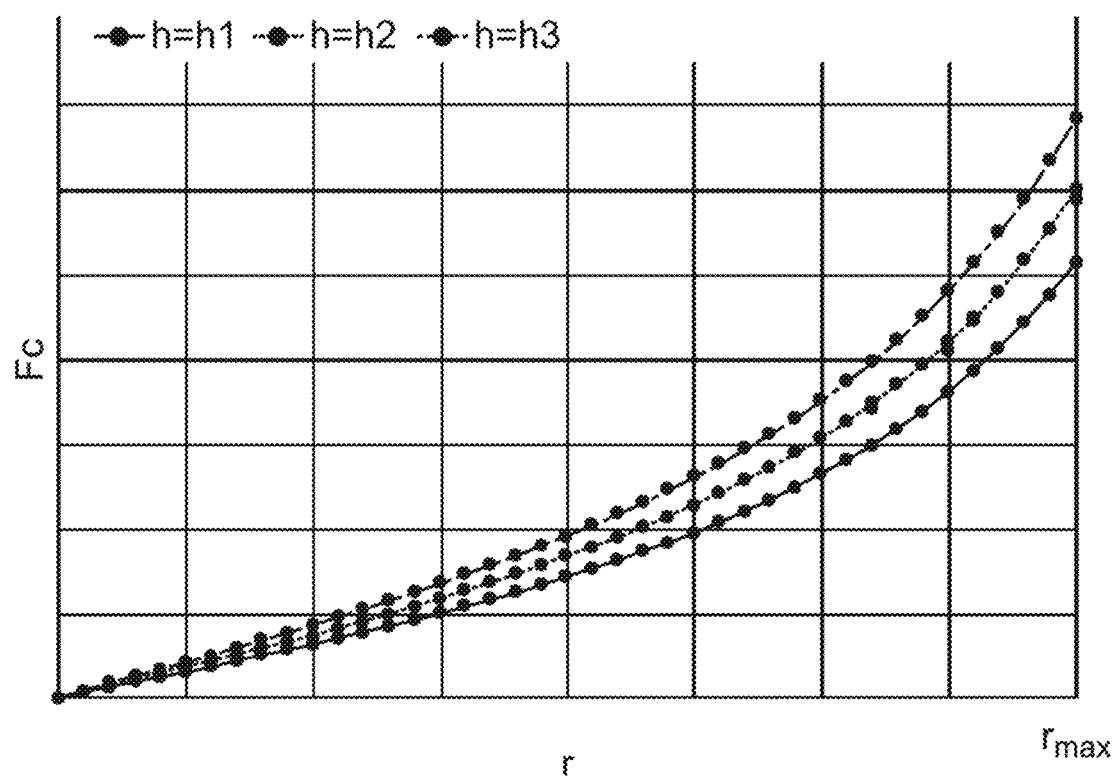
FIG. 8 is one example of a graph showing the values of the radial coordinate of the position of a person detected in the space of the building as a function of the distance in pixels from the centre of the region of interest of the thermal image of FIG. 3 to the centre of this image, and as a function of various heights of installation of the thermal imager of FIG. 2.

A graphical representation of the function Fc is shown in FIG. 8. This graph shows three curves of the variation in the wide-angle correction function Fc as a function of distance r, each curve being associated with a different height h of installation of the thermal imager 10. In this graph, the height h1 is less than the height h2, and the height h2 is less than the height h3. As is clear from this figure, the height h of installation of the thermal imager 10 has a slight influence on how the curve varies. In particular, the greater the height h of installation of the thermal imager 10, the more the distance separating the identified person from the centre C of the scene S increases with the increase in the distance r.

In order to further increase the accuracy of the actual position of the person obtained using the wide-angle correction function, a third factor Fa, called the angular correction factor, may be included in the wide-angle correction function Fc. The angular correction factor is adimensional.

Specifically, as indicated above, the closer a region of interest 21 of the deformed thermal image to a direction making an angle of 45° to the axes U1 and U2, the larger its deformation. Thus, the result of the wide-angle correction function such as defined by [Math. 6] proves to be less accurate in such a case.

The angular correction factor compensates for this decrease in accuracy. In particular, when the wide-angle correction function comprises the angular correction factor Fa, it is defined as:

$$Fc = Fn \cdot Fm \cdot Fa \quad \text{[Math. 7]}$$

Figure 10A:
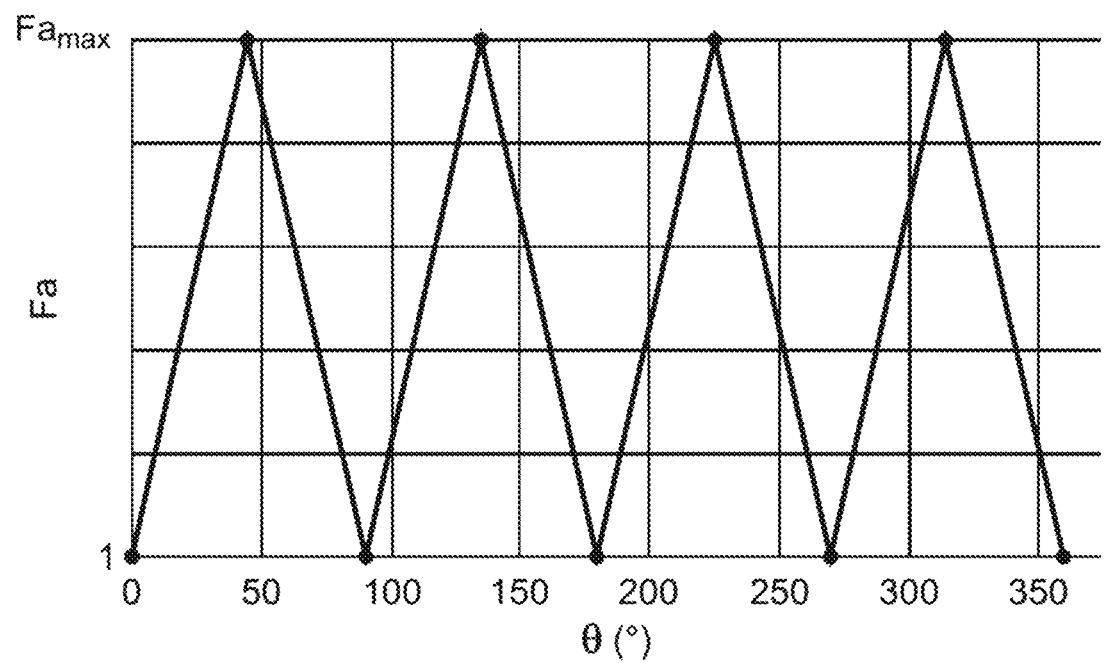
FIG. 10A shows one example of a curve of the variation in an angular correction factor used in one of the steps of the method of FIG. 1.
Figure 10B:
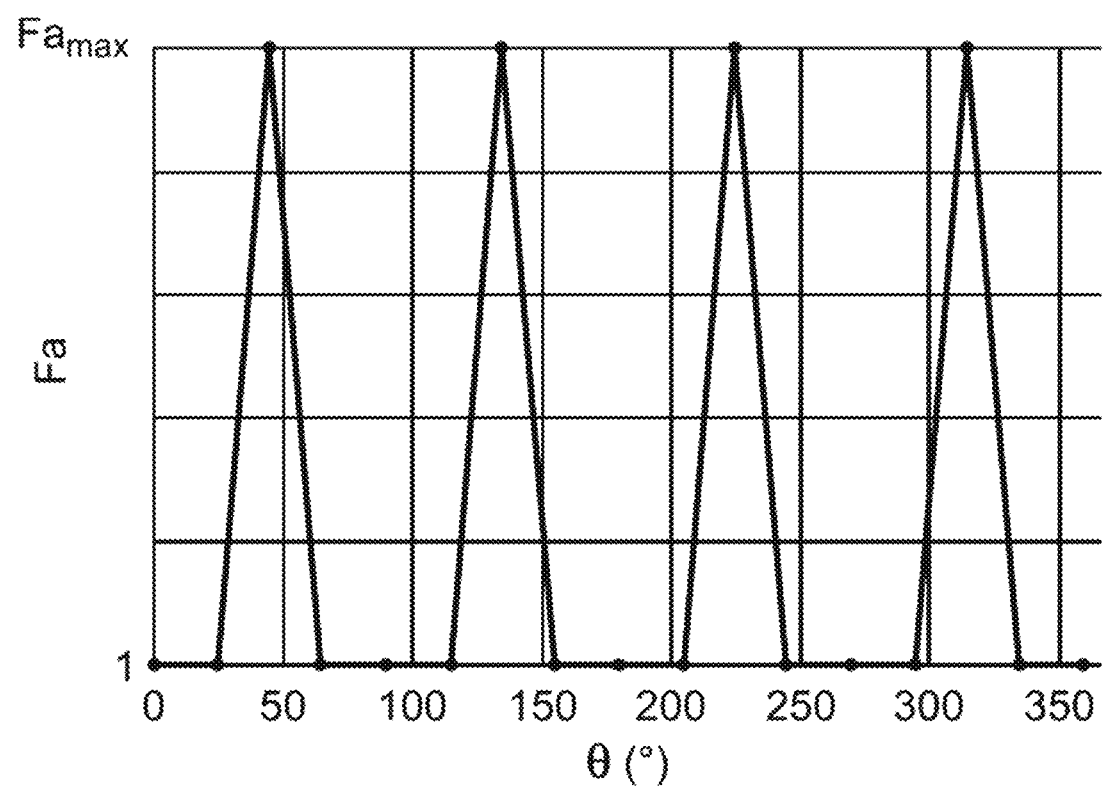
FIG. 10B shows another example of a curve of the variation in the angular correction factor used in one of the steps of the method of FIG. 1.

The value of the angular correction factor is dependent on the value of the azimuth θ. FIGS. 10A and 10B show two examples of curves defining the value of the angular correction factor as a function of the azimuth θ of the centre of the region of interest. As shown in these figures, the value of the angular correction factor is comprised between 1 and a maximum value $Fa_{max}$. For example, the maximum value $Fa_{max}$ of the angular correction factor may be comprised between 1.10 and 1.30.

In the case of FIG. 10A, the value of the angular correction factor Fa follows a sawtooth-shaped distribution the maximum value $Fa_{max}$ of which is associated with values of the azimuth θ of 45°, 135°, 225° and 315°. This makes it possible to compensate for the larger deformation specific to the regions of interest located in each of these directions. The angular correction factor Fa is equal to 1 when the azimuth is equal to 0°, 90°, 180° or 270°. This implies that when the centre of the region of interest 21 is located on one of the axes U1, U2 of the polar coordinate system presented above, the wide-angle correction function comprising the angular correction factor gives the same result as the wide-angle correction function when it does not comprise the angular correction factor. For values of the azimuth θ different from 0°, 45°, 90°, 135°, 180°, 225°, 270° and 315°, the value of the angular correction factor is higher than 1 but lower than the maximum value $Fa_{max}$.

In the case of FIG. 10B, the value of the angular correction factor Fa follows a sawtooth-shaped distribution but plateaus have been inserted between the 'teeth'. In this case, the maximum value $Fa_{max}$ is still associated with the values 45°, 135°, 225° and 315°. However, in contrast to the distribution of FIG. 10A, the value 1 of the angular correction factor is associated with ranges of values centred on the values 0°, 90°, 180° and 270°. For example, these ranges of values are located from 0° to 20°, from 70° to 110°, from 160° to 200° and from 250° to 290°.

The method 100 described above therefore allows the actual position of identified people in the space E of the building to be accurately obtained. In addition, the wide-angle correction being uniquely applied to the distance coordinate r, implementation of the method does not require resource-intensive computations.

It will be noted that the wide-angle correction function and the definition of the various factors thereof presented above are non-limiting, other wide-angle correction functions being usable in step 140. For example, the wide-angle correction function could be a polynomial function.

The method 100 may have a number of applications.

Figure 11:
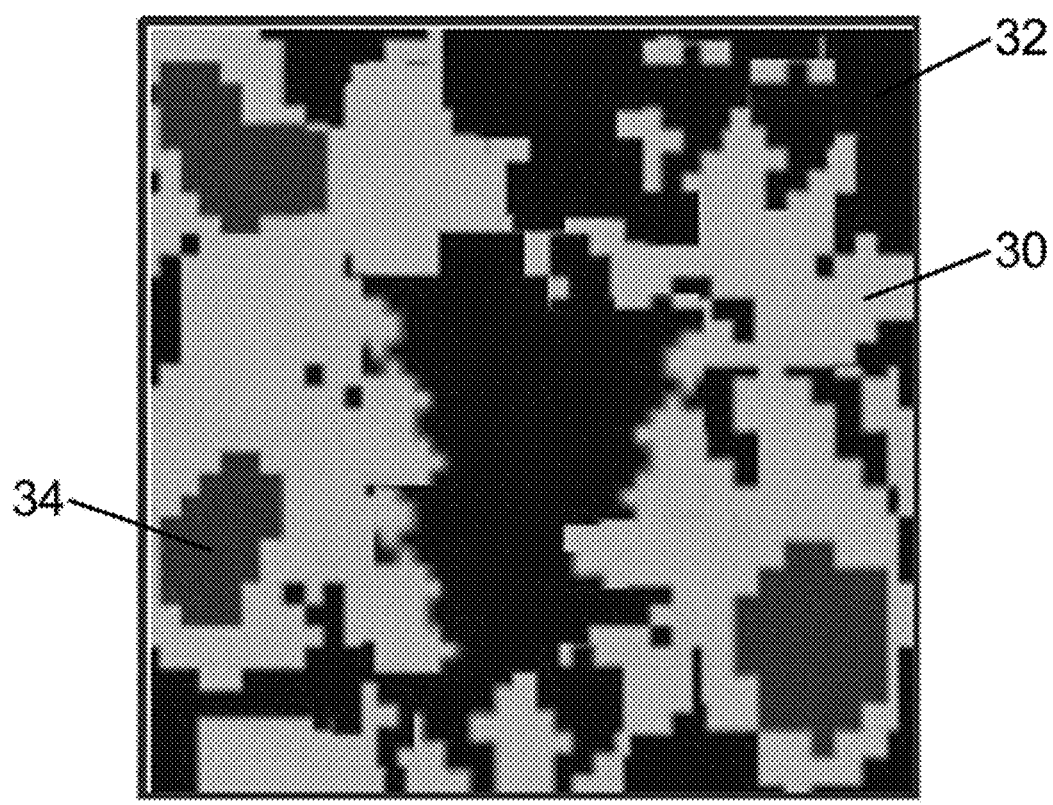
FIG. 11 shows one example of a density map obtained using the method of FIG. 1.

For example, the method 100 may be used to create a map of usage of the space E, one example of which is shown in FIG. 11. The usage map is obtained after the method 100 such as described above has been repeated for a prolonged period of time, two weeks for example. In particular, during this period of time, the method 100 may be repeated at regular or irregular intervals. Thus, a plurality of thermal images are generated in order to obtain therefrom the actual positions of people by applying the wide-angle correction function. By superposing the positions obtained for the people after each repetition of the method 100, it is possible to determine in which zones of the space E people are commonly present, in which zones of the space people are occasionally identified, and in which zones of the space no person has ever been identified. Different colours are attributed to each of these zones in the usage map. For example, in FIG. 11, the light zones, which have been referenced 30, correspond to zones of circulation, such as corridors, in which people were occasionally identified. The dark zones, which have been referenced 32, correspond to zones in which no one was ever identified. This is the case of zones occupied by furniture or walls. Lastly, the zones 34, the colour of which is intermediate between the light zones 30 and the dark zones 32, correspond to zones in which people are commonly identified. These zones 34 may for example correspond to workstations.

Applying the method 100 described above to produce usage maps allows, by virtue of the use of the wide-angle lens, the presence of people in a space of large size to be studied with a single thermal imager. Moreover, by virtue of application of the wide-angle correction function, the position of identified people in the space is obtained with a high level of accuracy, the various zones of the usage map produced thus being accurately delineated.

The method 100 may also be used to perform counting people. In particular, identification of the regions of interest allows the number of people present in the space E to be easily counted. In addition, since the position of these people in the space E is accurately determined, the method 100 has a major advantage in respect of counting people when a plurality of thermal imagers are distributed about a large meeting room. In such a case, the lack of accuracy of prior-art methods for obtaining the position of a person lead to errors when counting people in a room. These errors especially included counting multiple times a given person located in a position covered by the field angle of a plurality of thermal imagers. Specifically, since the position of a person obtained using these prior-art methods was deviated with respect to the true position of the person, each of the imagers potentially identified the same person as being located in different positions. The same person therefore risked being counted a plurality of times.

Figure 12:
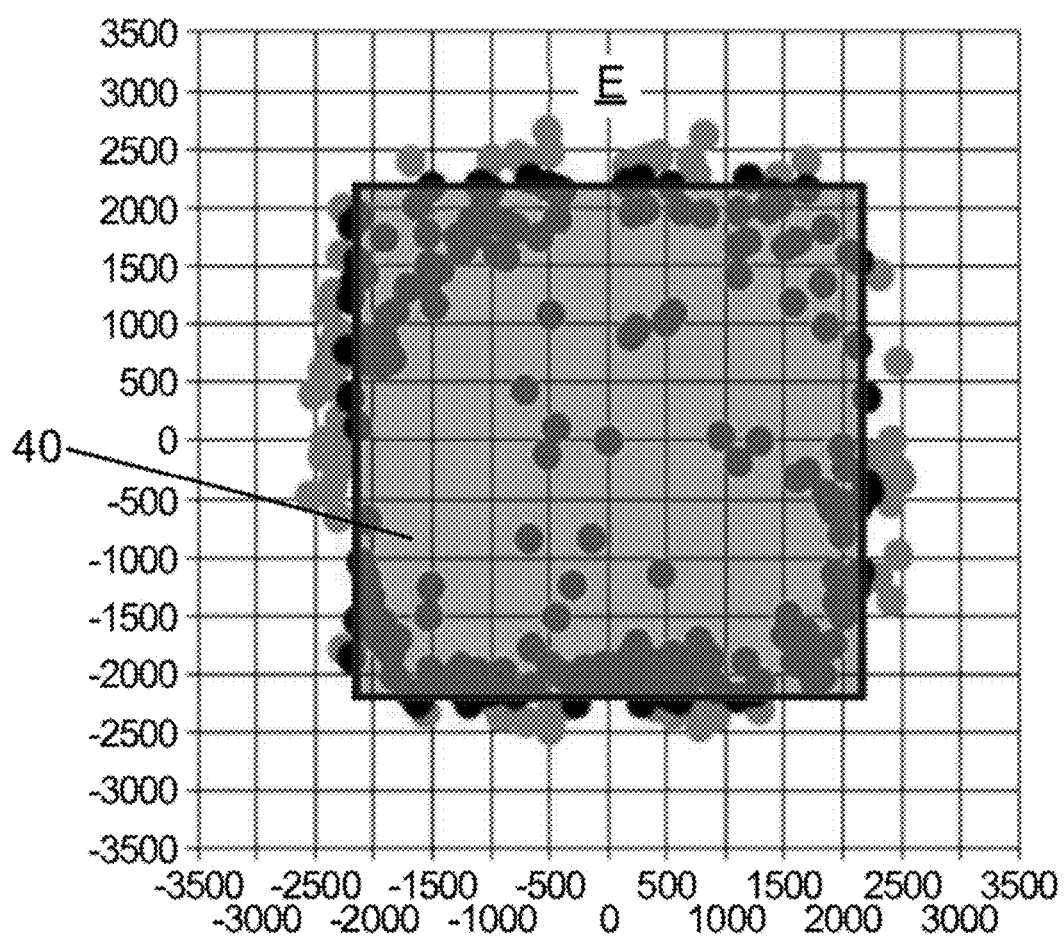
FIG. 12 shows one example of a filter applied to sort the positions of people obtained using the method of FIG. 1.

As may be seen in FIG. 12, in order to make it easier to count people, a filter 40 may be applied to restrict identification and counting of people to an area of the space E of size smaller than the area of this space E that the field angle of the thermal imager makes it possible to cover. In particular, identification and/or counting of people is limited to the area comprised in the filter 40. In FIG. 12, the filter 40 has a square shape, though this is non-limiting. The filter 40 could also have, for example, a rectangular shape, a circular shape, or any other shape defined by a set of points defining a closed perimeter.

The filter 40 may simplify the method 100 described above when it is known that a hot body that is not a person, for example a radiator, is present in the scene covered by the thermal imager. In particular, the filter may be configured so as to not identify and/or count people in the portion of the scene occupied by such a hot body.

Advantageously, when a plurality of thermal imagers are arranged in a room, the filters 40 applied by the imagers adjoin one another, this making it possible to guarantee people are identified and/or counted in the entire area covered by the field angles of the thermal imagers, while making it impossible for a plurality of imagers to identify and/or count the same person simultaneously.

The present disclosure also relates to the thermal imager 10 described above.

Lastly, the present disclosure relates to a home automation sensor 50, shown in FIG. 9. The home automation sensor 50 comprises the thermal imager 10. The thermal imager 10 is integrated into the home automation sensor 50. The home automation sensor 50 is configured to implement the method 100 for obtaining the position of a person in the space E such as described above. It will be noted that the home automation sensor 50 may further comprise other devices providing it with other functionalities. For example, the home automation sensor 50 may comprise a light sensor, a sound sensor, a movement sensor, a temperature sensor, a smoke sensor, a sensor of pollution of the ambient air, etc.

The present disclosure is not limited to the examples of the method for obtaining the position of a person in space, of the thermal imager and of the home automation sensor that were described above, merely by way of example, but encompasses any variant conceivable by those skilled in the art and that falls within the ambit of the claimed protection.

The invention claimed is:

1. A method for obtaining a position of a person in a space of a building via a thermal imager located at a height in said space and comprising a wide-angle lens, the method comprising steps of:
   a) acquiring with the thermal imager, through its the wide-angle lens of the thermal imager, a deformed thermal image of a scene in the space comprising the person, the thermal image being optically deformed by the wide-angle lens, and the deformed thermal image comprising a hot zone;
   b) extracting a region of interest corresponding to the person from the deformed thermal image using an algorithm for detecting hot zones;
   c) determining a position of the region of interest in the deformed thermal image by identifying polar coordinates distance r and angle θ of a center of the region of interest in a polar coordinate system, an origin of which is located at a center of the deformed thermal image;
   d) obtaining an actual position of the person in the space by applying a wide-angle correction function to the distance r so as to compensate for the deformation of the thermal image due to the wide-angle lens.

2. The method according to claim 1, wherein the wide-angle correction function applied in step d) comprises a normalization factor Fn for normalizing the distance coordinate r of the center of the region of interest and a metric factor Fm accounting for a field angle of the wide-angle lens and for a height of installation of the thermal imager in the space of the building with respect to a floor of said space, the wide-angle correction function comprising a product of the normalization factor Fn and of the metric factor Fm.

3. The method according to claim 2, wherein the normalization factor is defined as:

$$Fn = \frac{r}{\beta(1 - \alpha(r^2))}$$

where β is a scale coefficient and a is a distortion coefficient, the scale coefficient β and the distortion coefficient α having predetermined values.

4. The method according to claim 2, wherein the metric factor is defined as:

$$Fm = (h - h_0)\tan\left(\frac{\gamma}{2}\right)$$

where h is the height of the thermal imager with respect to the floor of the space, $h_0$ is a value representative of a height of the center of the region of interest with respect to the floor and γ is the field angle of the wide-angle lens.

5. The method according to claim 2, wherein the wide-angle correction function applied in step d) further comprises an angular correction factor Fa, and wherein a value of the angular correction factor Fa is dependent on a value of the angle coordinate θ, wherein the value of the angular correction factor Fa follows a sawtooth-shaped distribution, a maximum value of which is associated with values 45°, 135°, 225° and 315° of the angle coordinate θ.

6. The method according to claim 5, wherein the wide-angle correction function comprises a product of the normalization factor Fn times the metric factor Fm times the angular correction factor Fa.

7. A thermal imager comprising a wide-angle lens, the thermal imager being configured to implement the method according to claim 1.

8. The thermal imager according to claim 7, wherein the lens is a fisheye lens.

9. The thermal imager according to claim 7, comprising a long-wave-infrared imaging sensor for acquiring the thermal images.

10. A home automation sensor comprising the thermal imager according to claim 7.

11. The method according to claim 5, wherein the angular correction factor Fa is linear.

12. The thermal imager according to claim 7, wherein the wide-angle correction function applied in step d) comprises a normalization factor Fn for normalizing the distance coordinate r of the center of the region of interest and a metric factor Fm accounting for a field angle of the wide-angle lens and for a height of installation of the thermal imager in the space of the building with respect to a floor of said space, the wide-angle correction function comprising a product of the normalization factor Fn and of the metric factor Fm.

13. The thermal imager according to claim 12, wherein the normalization factor is defined as:

$$Fn = \frac{r}{\beta(1 - \alpha(r^2))}$$

where β is a scale coefficient and a is a distortion coefficient, the scale coefficient β and the distortion coefficient a having predetermined values.

14. The thermal imager according to claim 12, wherein the metric factor is defined as:

$$Fm = (h - h_0)\tan\left(\frac{\gamma}{2}\right)$$

where h is the height of the thermal imager with respect to the floor of the space, $h_0$ is a value representative of a height of the center of the region of interest with respect to the floor and γ is the field angle of the wide-angle lens.

15. The thermal imager according to claim 12, wherein the wide-angle correction function applied in step d) further comprises an angular correction factor Fa, and wherein a value of the angular correction factor Fa is dependent on a value of the angle coordinate θ, wherein the value of the angular correction factor Fa follows a sawtooth-shaped distribution, a maximum value of which is associated with values 45°, 135°, 225° and 315° of the angle coordinate θ.

16. The thermal imager according to claim 15, wherein the wide-angle correction function comprises a product of the normalization factor Fn times the metric factor Fm times the angular correction factor Fa.

17. The thermal imager according to claim 15, wherein the angular correction factor Fa is linear.

18. A processor configured to implement software configured to cause the method according to claim 1 to be performed.

* * * * *